No. 848,228. PATENTED MAR. 26, 1907.
J. ETTEL.
COOLER FOR BEER OR OTHER BEVERAGES.
APPLICATION FILED OCT. 18, 1906.

Witnesses
Max B. A. Doring.
Edward Wolff

Inventor
Johann Ettel
By his Attorney

UNITED STATES PATENT OFFICE.

JOHANN ETTEL, OF BROOKLYN, NEW YORK.

COOLER FOR BEER OR OTHER BEVERAGES.

No. 848,228.

Specification of Letters Patent.

Patented March 26, 1907.

Application filed October 18, 1906. Serial No. 339,435.

*To all whom it may concern:*

Be it known that I, JOHANN ETTEL, a subject of the Emperor of Austria-Hungary, and a resident of Brooklyn, county of Kings, State of New York, have invented certain new and useful Improvements in Coolers for Beer or other Beverages, of which the following is a specification.

The present invention has for its object to provide a cooler for beer or other beverages for use in the household, and principally in bars, restaurants, and the like.

My invention is illustrated in the accompanying drawing, in which similar reference-letters denote corresponding parts, and in which—

Figure 1:
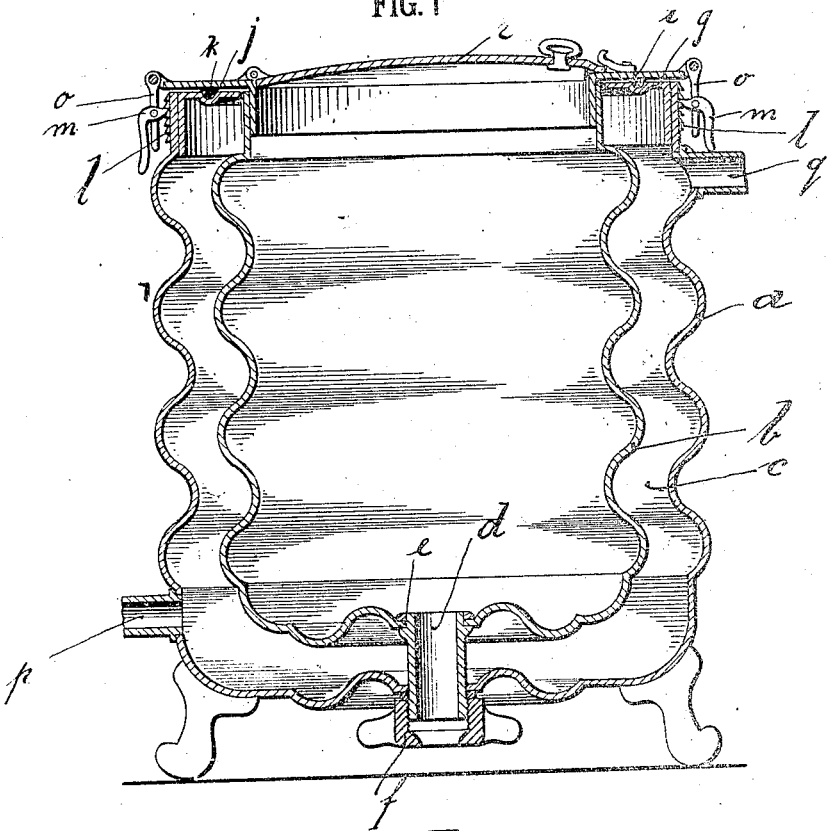
Figure 2:
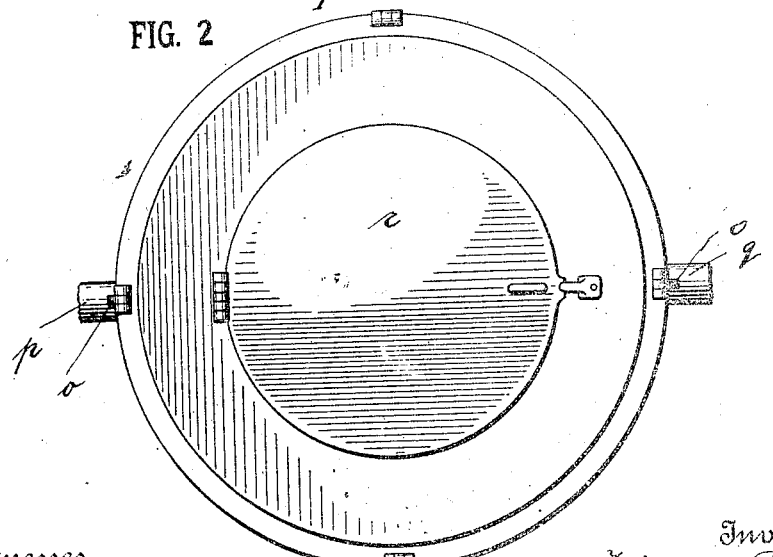

Figure 1 is a vertical section, and Fig. 2 a top plan view of the cooler.

The cooler is composed of an outer receptacle $a$, made with waved walls, and a correspondingly-shaped inner receptacle $b$, that is adapted to form between its own walls and those of the first receptacle $a$ space $c$, in which the beverage is contained. The inner receptacle is adapted to hold ice. In the bottom of both receptacles a central hole is provided to receive a short pipe $d$, which serves as a discharge for the ice-water. The pipe $d$ is provided with a shoulder $e$ at its upper end, from which the inner receptacle is supported, and is secured in position by a thumb-nut $f$, working on the threaded outer end thereof. The upper ends of each receptacle may be formed as cylindrical collars, the outer receptacle having an inwardly-extending circular flange $g$ and the inner receptacle an outwardly-extending circular flange $i$. The flange $g$ of the receptacle $a$ is provided with a circular groove $j$ to receive a packing-ring $k$, of rubber or other suitable material, and the outwardly-extending flange of the inner receptacle $b$ is adapted to rest upon said ring $k$ and to be pressed against it by suitable means. For the latter purpose I provide at opposite sides of the upper end of the receptacle $a$ indentations or teeth $l$, into which catches $m$ engage, that are pivotally secured to downwardly-extending ears $o$, hinged at corresponding sides to the outwardly-extending flange of the receptacle $b$. By disengaging the catches from the said teeth of the receptacle $a$ the ice-receptacle $b$ can be removed.

$p$ is the inlet of the receptacle $a$ for the beverage, and $q$ the outlet or discharge opening.

$r$ is a cover for the ice-receptacle.

What I claim, and desire to secure by Letters Patent, is—

In a cooler for beverages, the combination with outer and inner receptacles of waved metal, the upper end of said outer receptacle being formed with an inner flange and having indentations on its outer circumference, an outer flange on the said inner receptacle to overlap the said flange of the outer receptacle, downwardly-extending ears hinged to said outer flange, catches pivoted to said ears and adapted to engage with the notches or indentations of the outer receptacle and an elastic packing-ring between the overlapping flanges of the said both receptacles, substantially as and for the purpose specified.

Signed at New York this 15th day of October, 1906.

JOHANN ETTEL.

Witnesses:
 JOSEPH E. CAVANAUGH,
 MAX D. ORDMANN.